United States Patent [19]

Ouska

[11] 3,753,505

[45] Aug. 21, 1973

[54] ARTICLE ROLL-OVER DEVICE
[75] Inventor: Ralph C. Ouska, Hinsdale, Ill.
[73] Assignee: F M C Corporation, San Jose, Calif.
[22] Filed: Mar. 10, 1971
[21] Appl. No.: 122,713

[52] U.S. Cl............. 214/1 QF, 214/148, 198/33 R
[51] Int. Cl.............................................. B65g 7/00
[58] Field of Search............. 214/1 Q, 1 QF, 130 R, 214/130 C, 148, 46.32, 313

[56] References Cited
UNITED STATES PATENTS

| | | | |
|---|---|---|---|
| 3,011,657 | 12/1961 | Schütze et al. | 214/46.32 X |
| 1,668,300 | 5/1928 | Aiken | 214/148 X |
| 2,862,629 | 12/1958 | Aberle | 214/1 QF |
| 2,786,588 | 3/1957 | Hill | 214/130 C X |
| 2,361,222 | 10/1944 | McBride | 214/1 Q X |
| 2,567,819 | 9/1951 | Matteson et al. | 214/1 Q |
| 2,880,889 | 4/1959 | Huffington | 214/1 Q |
| 3,123,236 | 3/1964 | Contaldo | 214/1 Q X |

FOREIGN PATENTS OR APPLICATIONS 1,093,326  5/1955  France .................. 214/130 C Primary Examiner—Gerald M. Forlenza
Assistant Examiner—Frank E. Werner
Attorney—F. W. Anderson and C. E. Tripp

[57] ABSTRACT

A coil of metal or paper strip to be upended or downended is placed on one bed of a cradle which is constructed of semicircular vertical parallel plates and which is mounted in rolling engagement on a track beneath the cradle. The cradle is then rolled along the track one-quarter turn or 90° by a drive system to axially reorient and laterally transfer the coil. One such drive system includes a combination of pivotally interconnected levers which are actuated by a drive train. As the cradle reaches its end point, the upended or downended coil then rests on a second bed of the cradle perpendicular to the initial bed.

3 Claims, 20 Drawing Figures

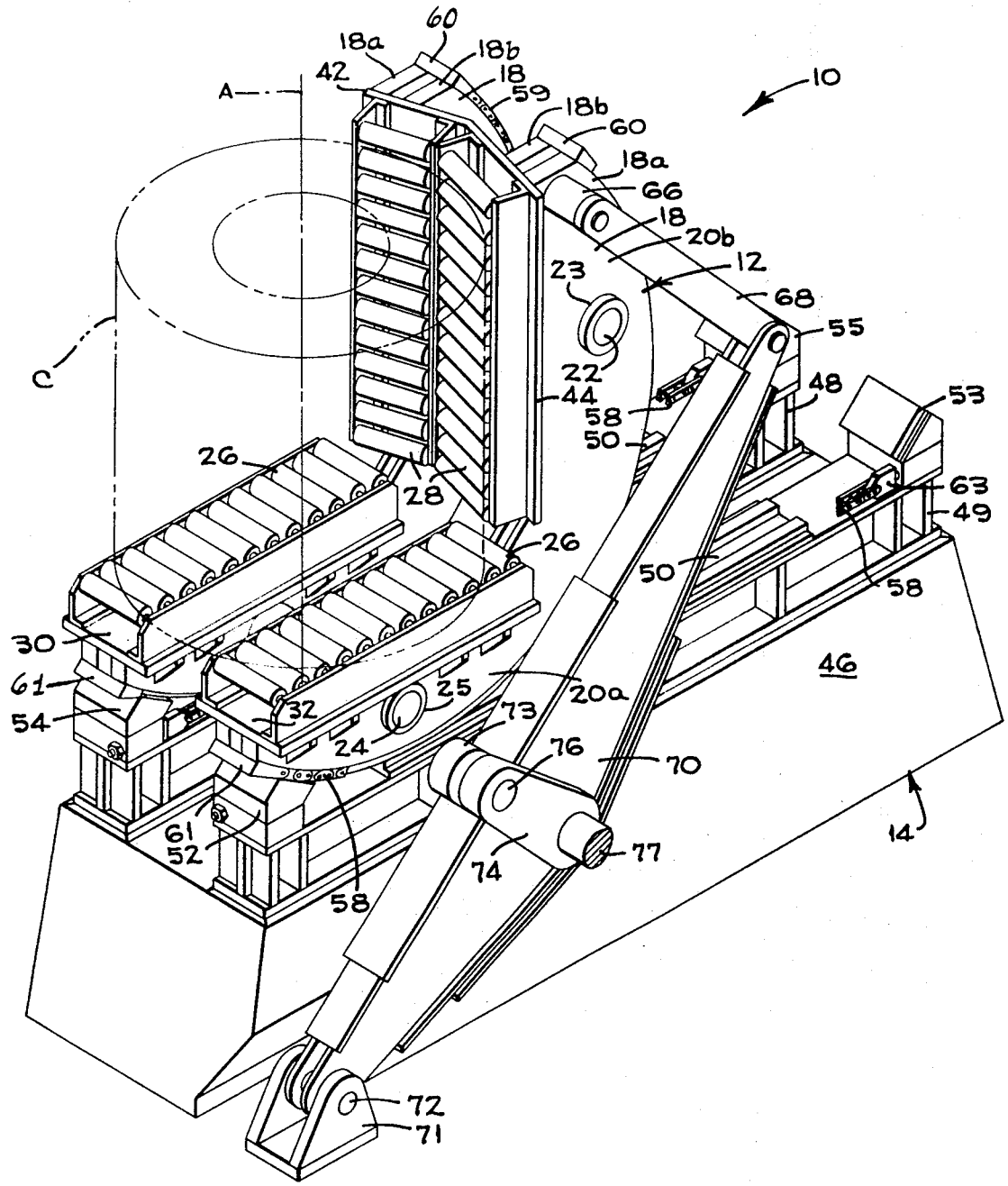
FIG_1
INVENTOR.
RALPH C. OUSKA
BY F. W. Anderson
C. E. Tripp
ATTORNEYS

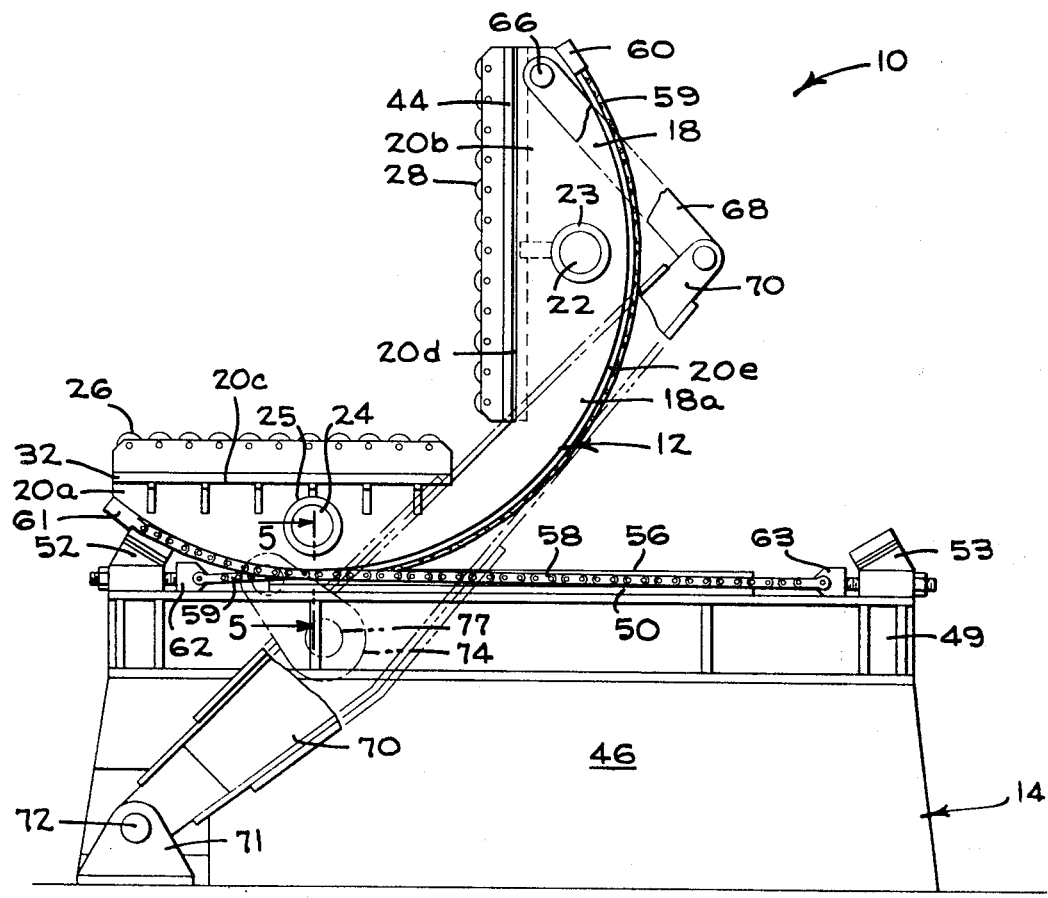
FIG_2
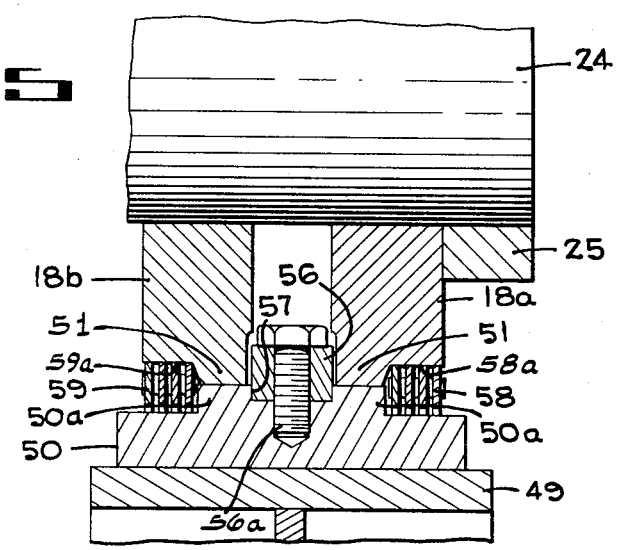
FIG_5

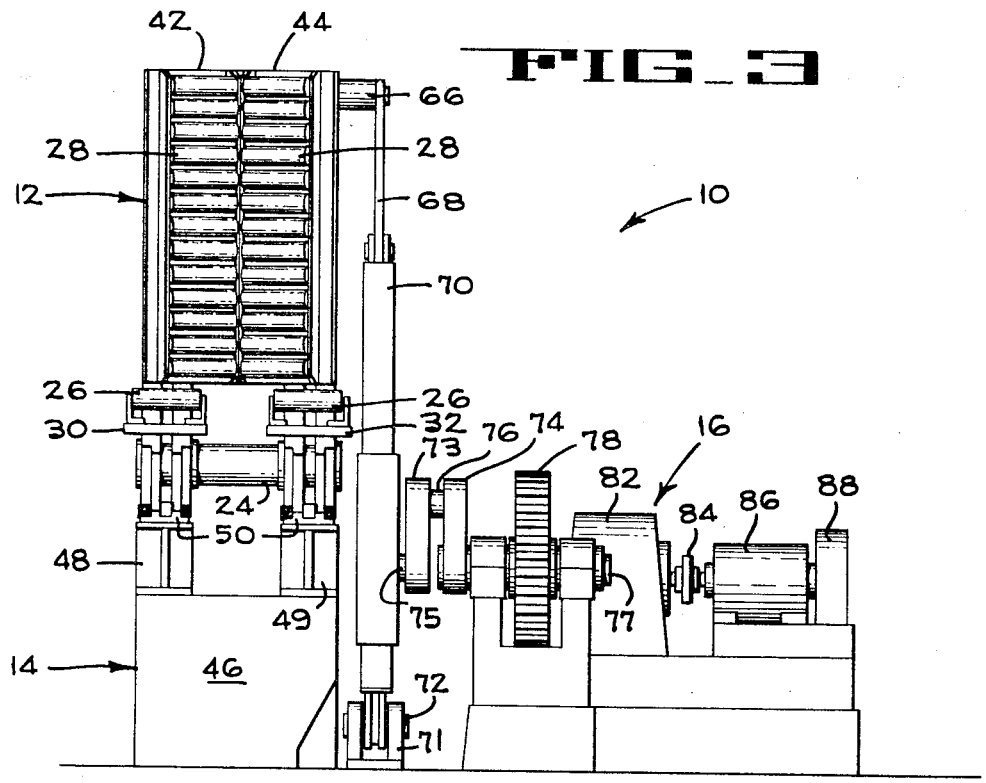
FIG_3
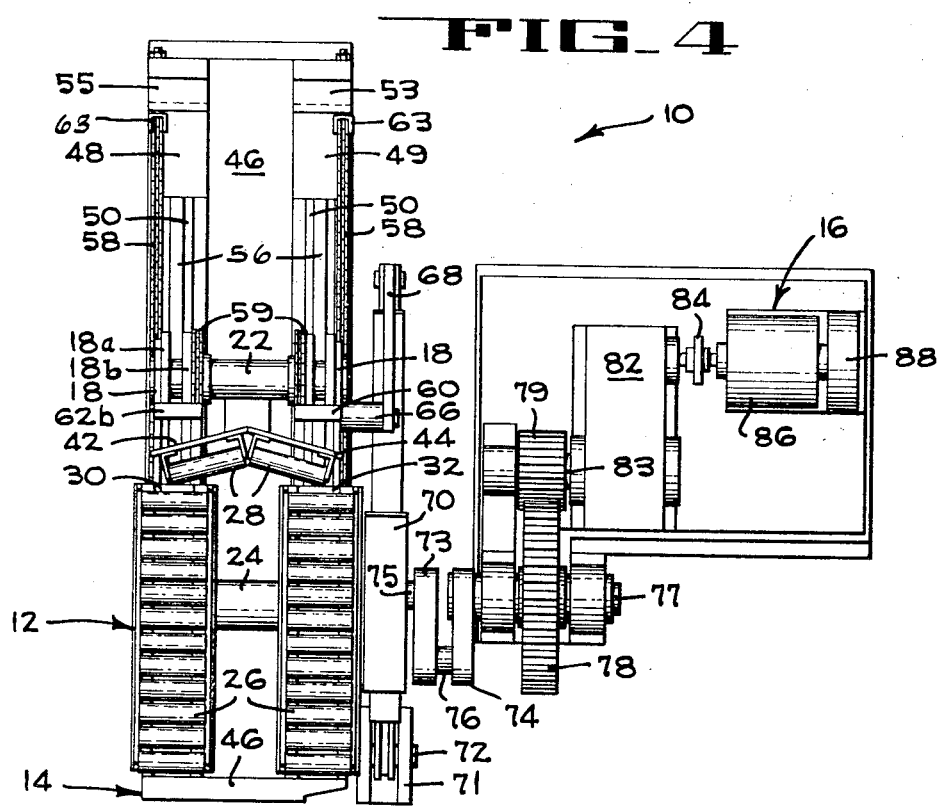
FIG_4

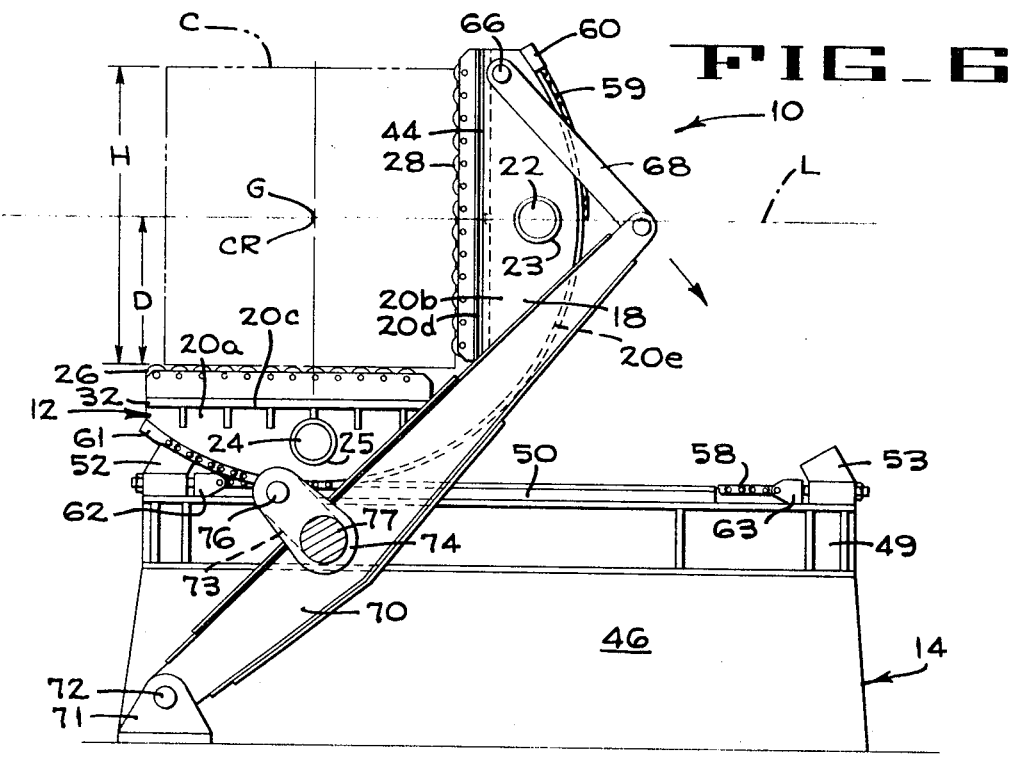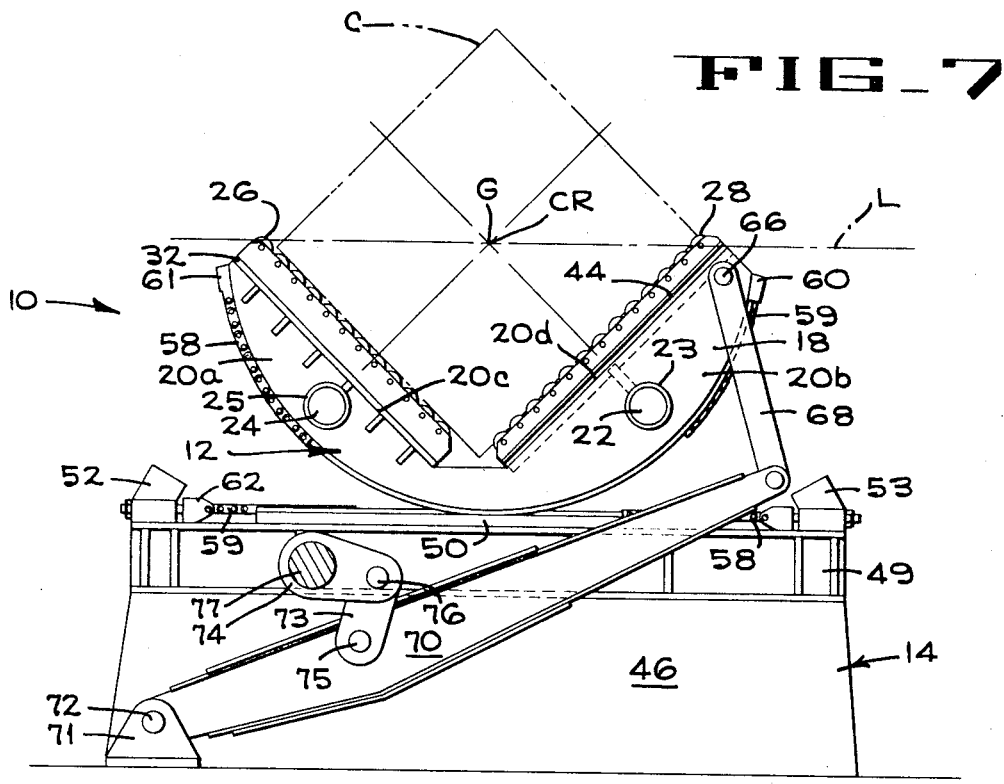

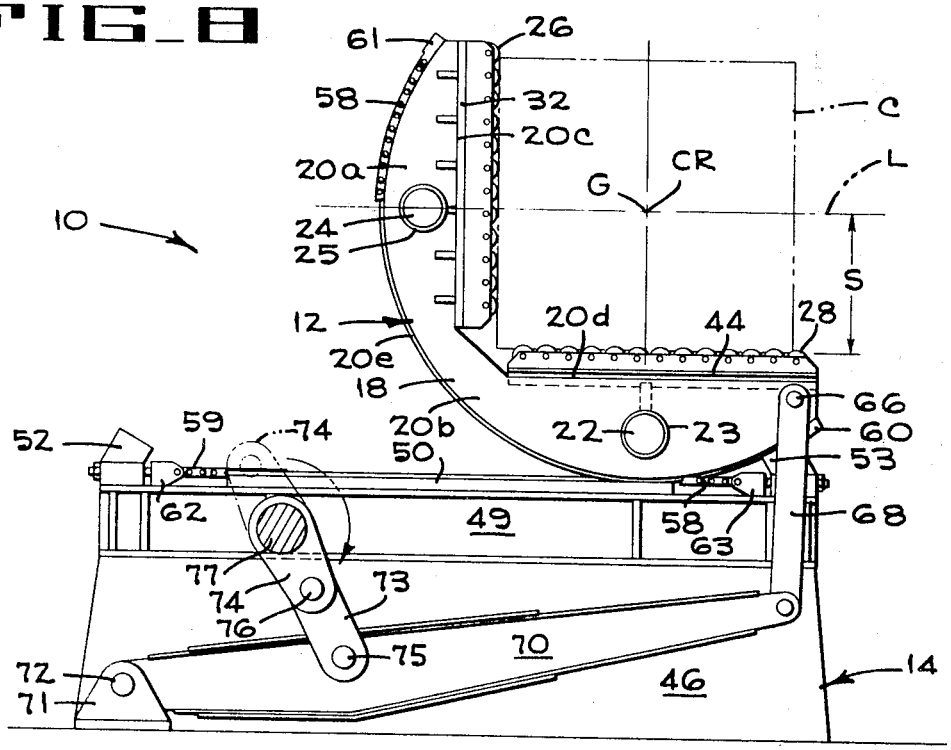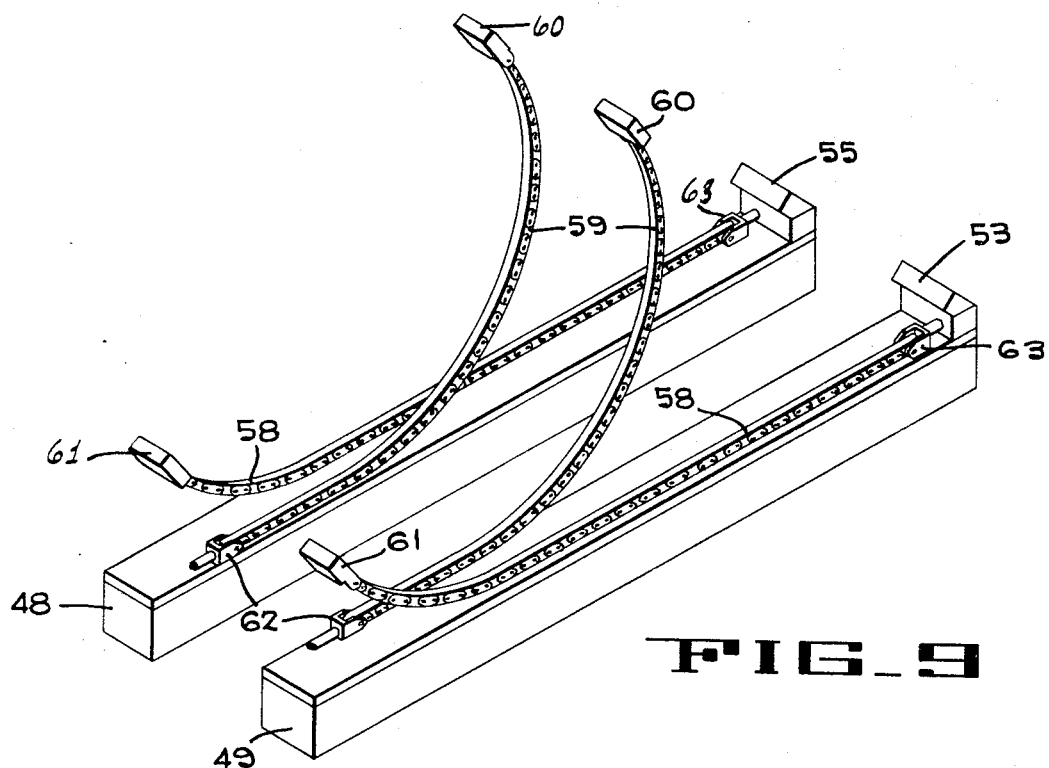

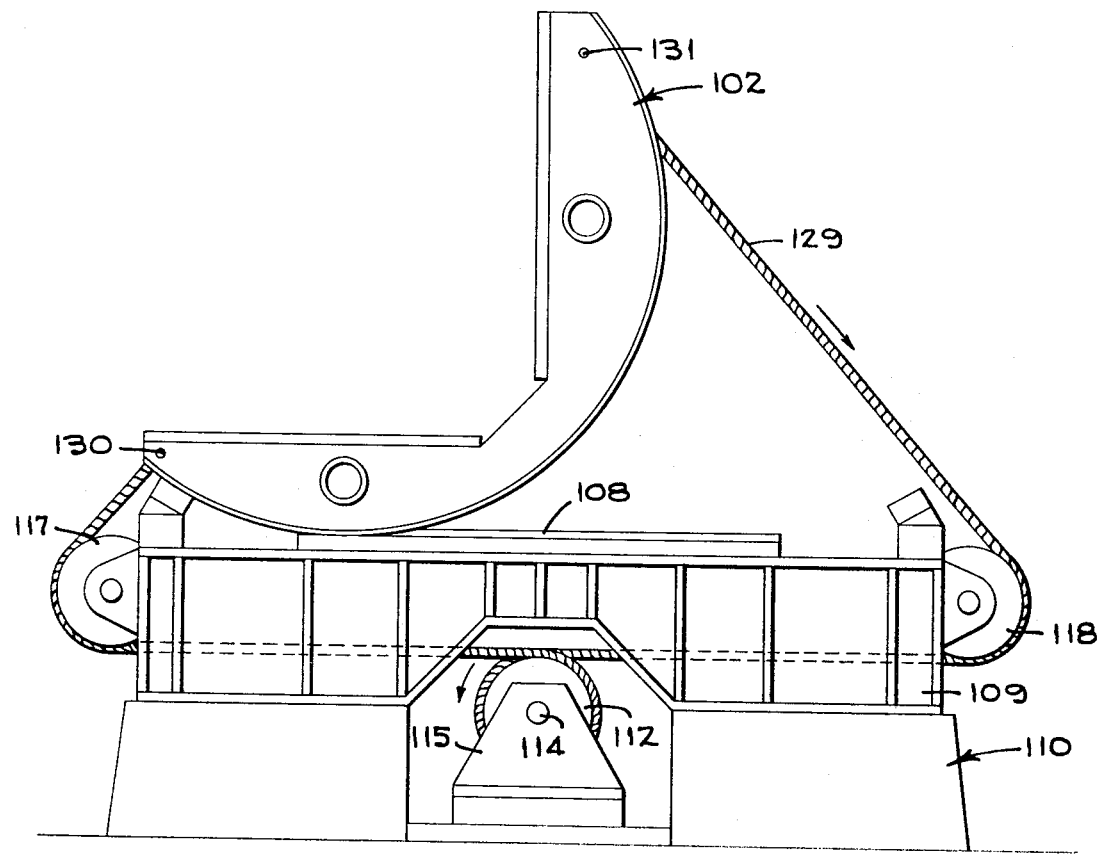
FIG_10
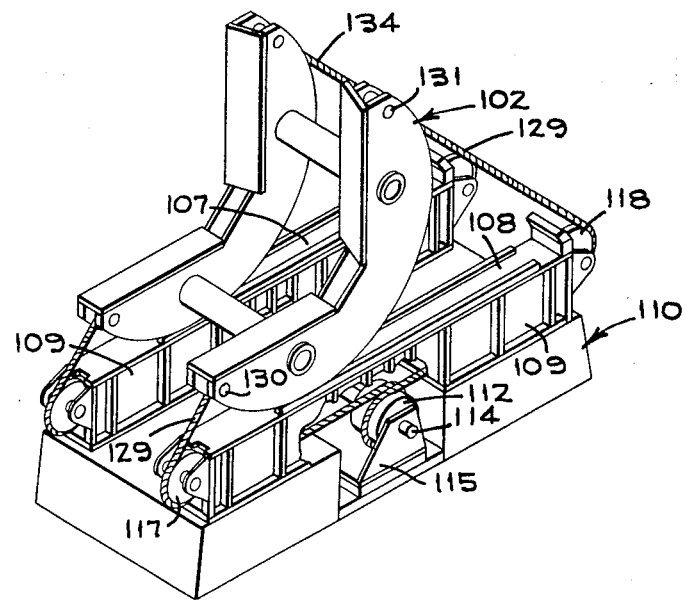
FIG_11

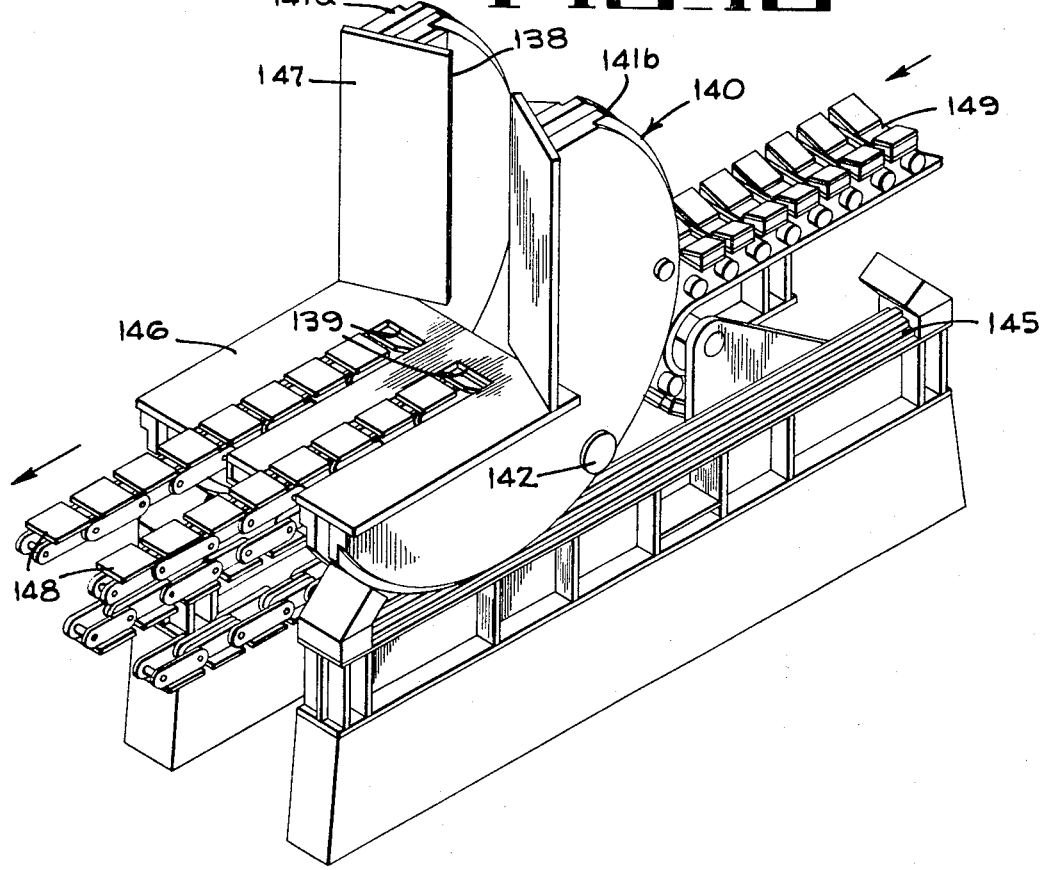
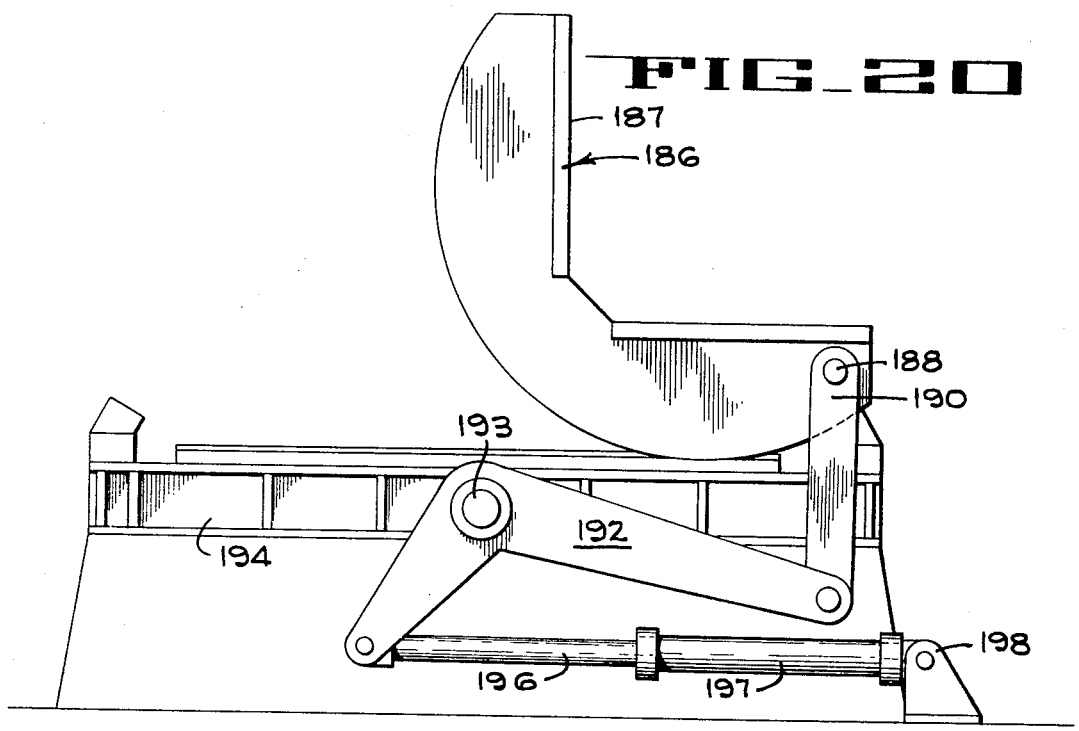

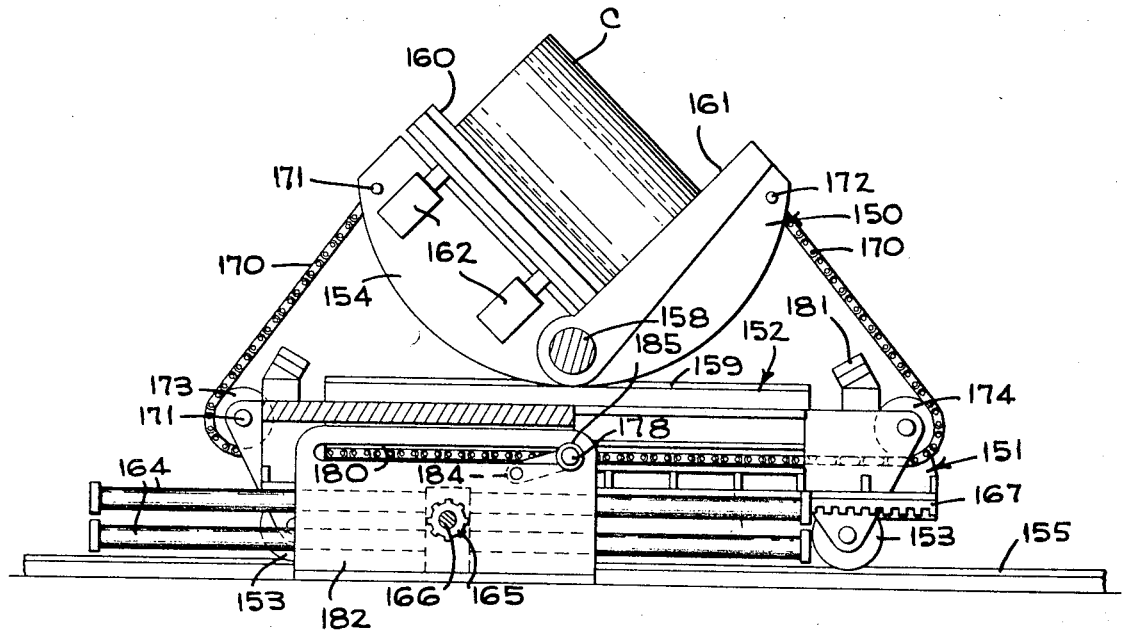
FIG_15
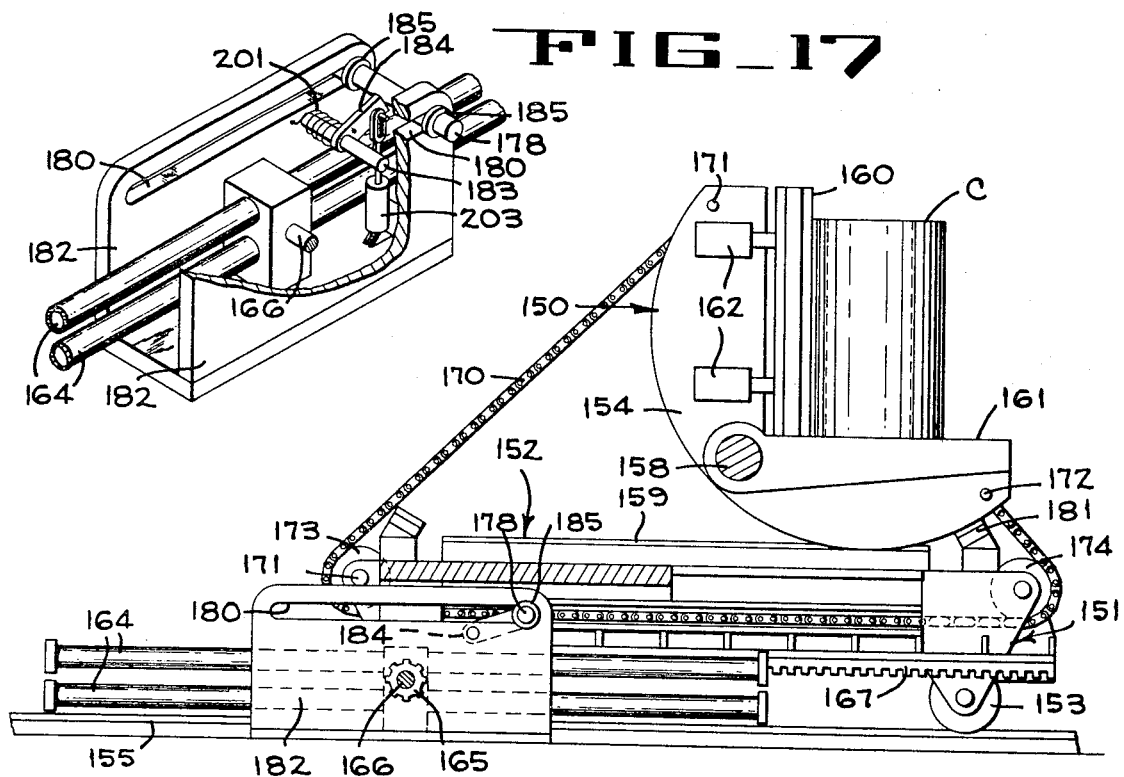
FIG_17
FIG_16

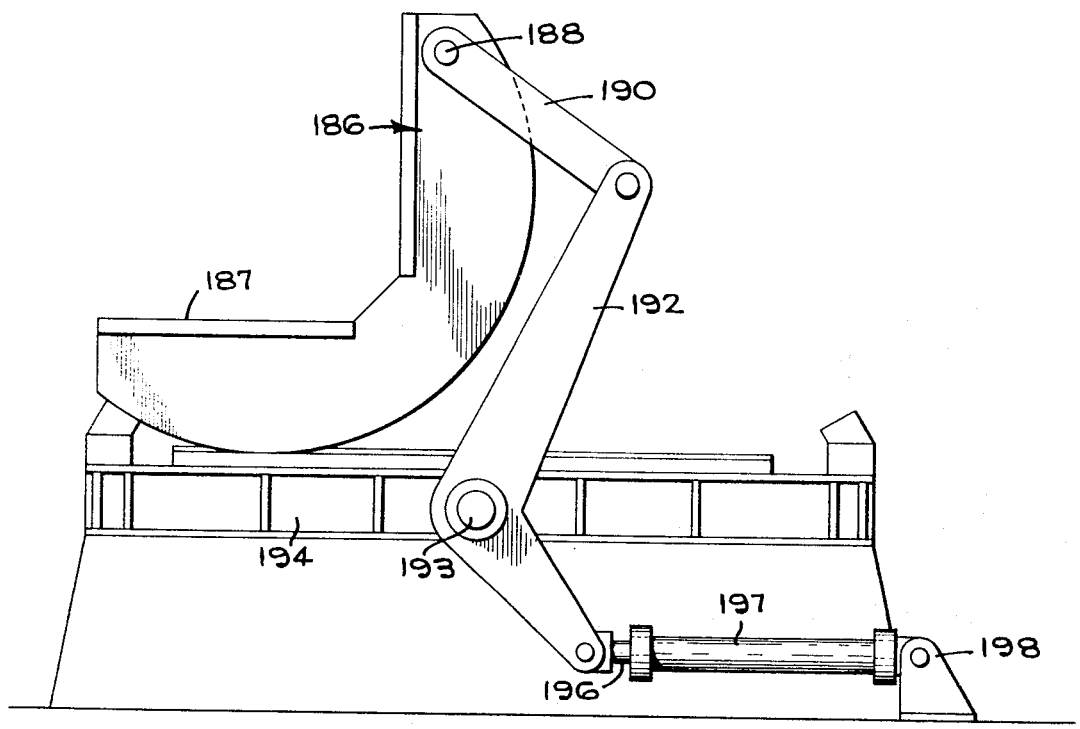
FIG_18
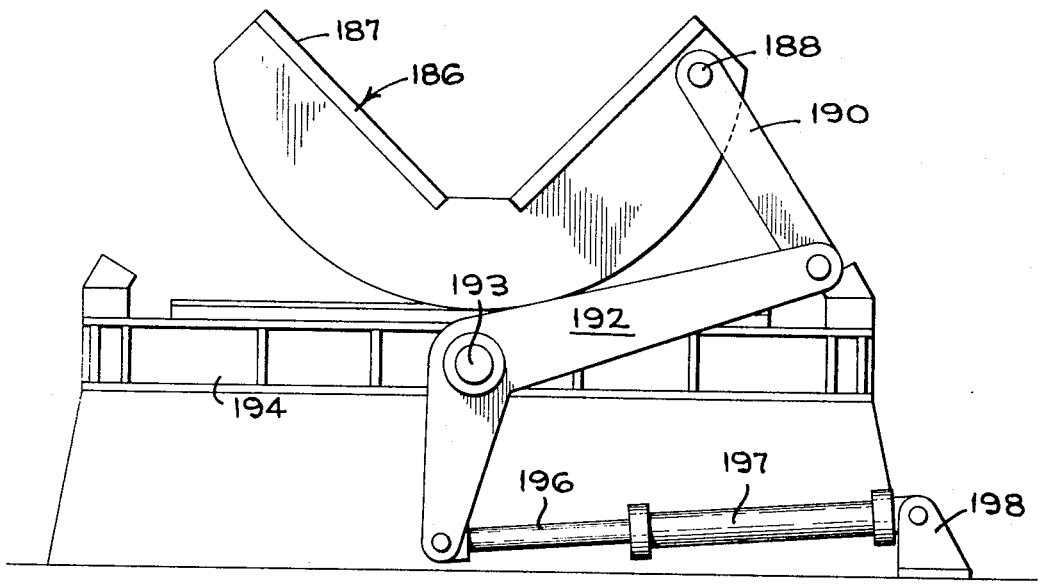
FIG_19

ARTICLE ROLL-OVER DEVICE

BACKGROUND OF THE INVENTION

This invention relates to article handling apparatus and more particularly to apparatus for transferring coils of material from one operation to another.

Rolling mills, warehouses and manufacturing plants handle large and heavy coils of material, such as steel or other metal strip, or paper, by crane, truck or conveyor. These coils may weigh sixty thousand pounds or more. Sometimes the coils are carried on end and sometimes on their sides, and frequently the coil has to be turned over either from end to side or from side to end.

To avoid damaging the coiled material, special means for accomplishing this change of position have been employed. One of the most common types of devices used for repositioning a coil or similar object has a pair of beds mounted on a member that rotates on an axis which is fixed in space, at least during rotation, such as shown in the patent to Huffington U.S. Pat. No. 2,880,889. The coil, which is received on one bed in a particular orientation, is upended in place, transferred to the other bed and brought to rest in a different orientation. Sometimes, the coil receiving member can move laterally before or after reorientation of the coil as shown, for example, in the patent to Matteson et al. U.S. Pat. No. 2,567,819 and, to a limited extent, in the patent to Kratzenberg U.S. Pat. No. 2,599,846. The devices which move laterally only before or after coil reorientation require more complicated drive mechanism to impart distinct translational and rotary movement to the coil while the devices which impart only rotary movement to the coil sacrifice the ability to move the coil laterally. In some of these devices, the need for raising the coil over a pivot center requires that the machines be very large and heavy and have drive systems capable of developing very large torque and horsepower.

SUMMARY OF THE INVENTION

The present invention relates to an improved device for upending or downending coils of strip steel and other coiled materials or possibly blocks of material in which there is lateral shifting of the material as well as rotation thereof. The apparatus of this invention includes a cradle constructed of semicircular roll segments or arcuate segments mounted in rolling engagement on a track which in turn is supported by some form of supporting structure. The cradle is rolled along the track by a drive system, several embodiments of which are disclosed. One drive system includes a series of pivotally mounted levers driven by an electromechanical drive train which rolls the cradle, one-quarter turn or 90° along the track, from one position to another, and returns the cradle to its initial position without need for reversing the drive train. Another drive system uses pivotally interconnected levers in combination with a hydraulic cylinder. As the piston of the cylinder is extended the levers are pivoted and consequentially roll the cradle along the track from one position to the other. To return the cradle to its initial position the piston is withdrawn and the cradle is rolled to the starting position. A third drive system incorporates a reversible drum and sheave arrangement. Cable is strung from one end of the cradle over the drum and sheaves and attached to the other end of the cradle. As the drum is rotated tension is created on the cable which pulls the cradle over one-quarter turn from one position to another. To return the cradle to its initial position the drum is rotated in a reverse direction and the cradle is pulled by the cable to its starting point.

In operation, a coil of material is placed on an initially horizontal bed or support surface of the cradle, the cradle is rolled through one-quarter turn of 90° along the track and the upended or downended coil, now resting on the bed or support surface perpendicular to the initially horizontal bed and in a different lateral position, is removed by whatever means available. The empty cradle is then rolled back to its starting position ready to load another coil.

One embodiment of the invention utilizes the same cradle and track arrangement for upending or downending coils in combination with a stripper car. A coil is first stripped from a mandrel while the cradle is held in place, and then, once clear of the mandrel, the cradle is rolled over by a cable and sheave arrangement to a position at which the upended coil can be removed by a conveyor.

It is therefore one of the objects of this invention to provide coil handling apparatus adapted to receive varying diameter coils with their axes extending in either vertical or horizontal direction, rotate the coils, and transfer them so that their axes will be perpendicular to the initial direction of the axes.

It is another object of this invention to minimize or completely eliminate lifting of the center of gravity of the coil while still retaining a desired translation and thus greatly reduce torque and power requirements.

A further object is to provide a device which can be used to roll over objects and which can be incorporated as part of or within another machine.

Further objects and advantages of the invention will become apparent by reference to the following specification taken in conjunction with the accompanying drawings.

BRIEF DESCRIPTION OF THE DRAWINGS

FIG. 1 is a perspective of one embodiment of the coil roll-over device of the present invention with parts broken away.

FIG. 2 is a side elevation of the coil roll-over device of FIG. 1 with parts broken away.

FIG. 3 is an end view of the coil roll-over device of FIG. 1 with parts broken away.

FIG. 4 is a plan view of the coil roll-over device of FIG. 1.

FIG. 5 is a sectional view on the line 5—5 of FIG. 2.

FIGS. 6, 7 and 8 are views of the coil roll-over device of FIG. 1 with the cradle in initial, intermediate and final operational positions, respectively.

FIG. 9 is a perspective showing the restraining chains of the device of FIG. 1 with the cradle and track removed.

FIG. 10 is a side elevation of a coil roll-over device with a cable and sheave drive mechanism.

FIG. 11 is a perspective of the coil roll-over device of FIG. 10.

FIG. 12 is a perspective of a coil roll-over device with platens slotted for engagement with conveyor strands.

FIGS. 13, 14, 15 and 16 are side elevation drawings with parts in section of a coil roll-over-stripper combination showing four operational positions.

FIG. 17 is a perspective of the mounting of the slider block of the apparatus of FIGS. 13 through 16 with parts broken away.

FIGS. 18, 19 and 20 are side elevations of a coil roll-over device with a hydraulic piston-lever drive system in three operational positions.

DESCRIPTION OF THE PREFERRED EMBODIMENTS

Figure 13:
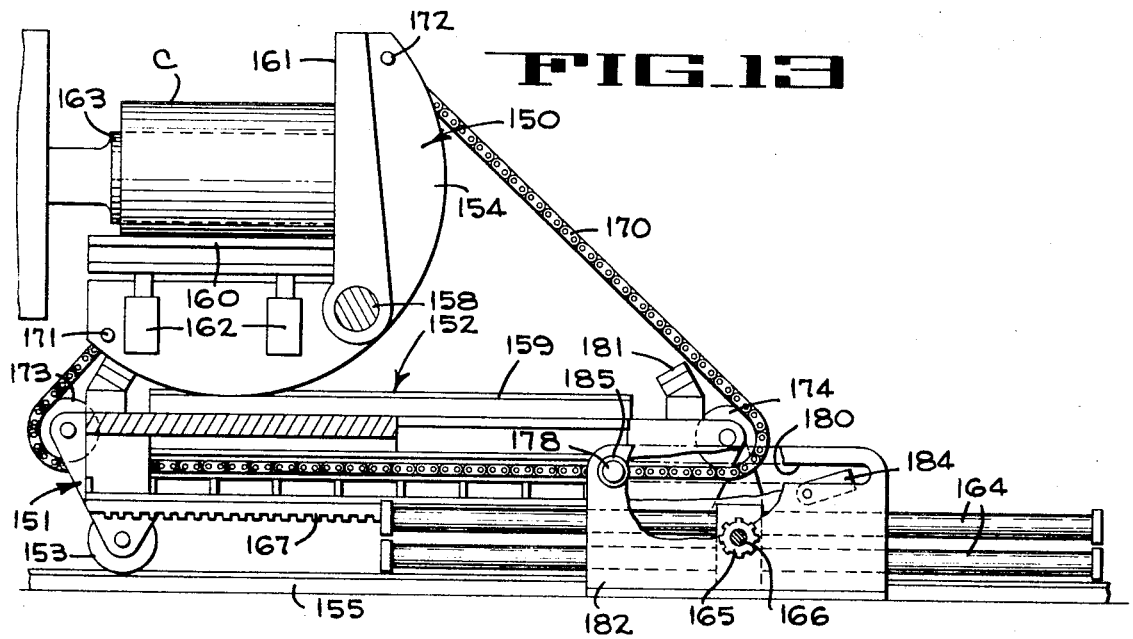
Figure 14:
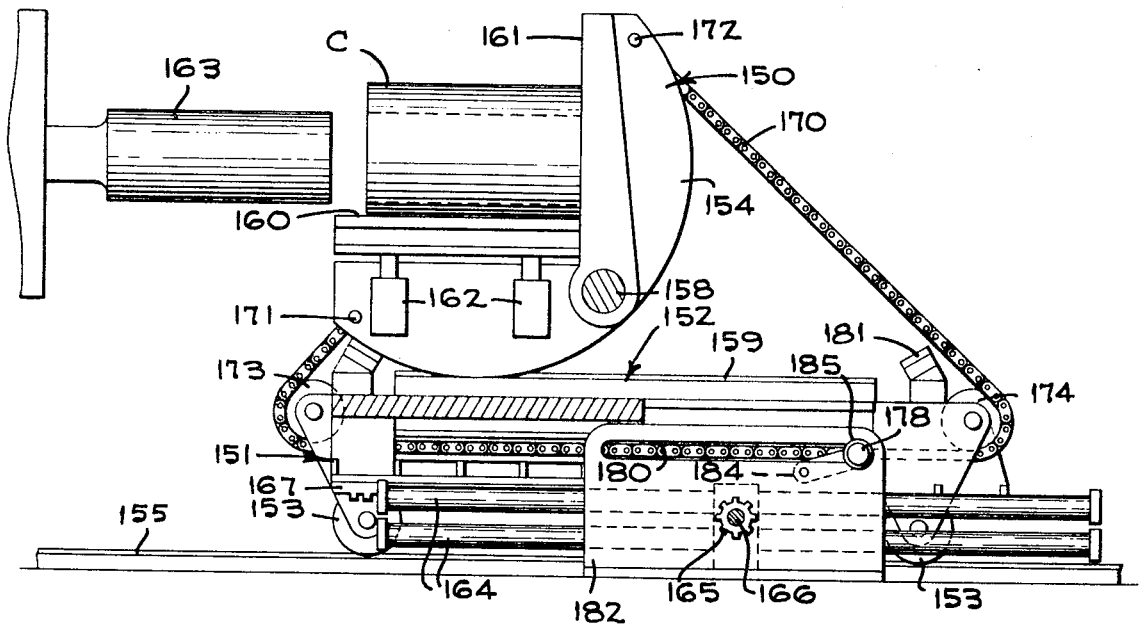

The coil roll-over device 10 (FIGS. 1 to 4) includes a cradle 12, a supporting structure 14, and a drive system 16 (see FIG. 3). The cradle itself is composed of the two rigid, composite, arcuate side frames 18 each of which includes two spaced segments 18a and 18b which are maintained in a parallel vertical relation by transverse shafts 22 and 24 secured therein. Collars 23 and 25 are rigidly attached to the shafts 22 and 24 respectively at the inner and outer surfaces of each side frame 18 to maintain the frames in parallel relationship on the shafts. Each side frame 18 has two legs 20a and 20b (FIG. 2) defining support surfaces 20c and 20d respectively at right angles to each other, and a semi-cylindrical support surface 20e, which extends along the outer surfaces of legs 20a and 20b.

Roller conveyor sections 26 are mounted on support plates 30 and 32 which are secured to and form a bed or platen on the two support surfaces 20c of legs 20a. Mounted on the two support surfaces 20d (shown in a vertical position in FIG. 2) of the semicircular supporting side frame pairs 18 are two support plates 42, 44 on which another set of roller conveyors 28 are attached in an inclined relationship to each other forming a V-top bed for supporting the curved surface of the coil as shown in FIG. 1. The roller conveyor sections 26 and 28 define beds to receive an object such as a coil C which may, for example, be strip steel, paper, cable, or other heavy material.

The supporting structure 14 consists of a foundation 46, two spaced elongate track supports 48 and 49 secured to the foundation, and two cardle tracks 50 which are secured to the supports 48 and 49 respectively and provide generally straight metal horizontal surfaces on which the cradle can roll. At each end of the track supports are mounted stop blocks 52, 53, 54 and 55. The stop blocks are formed structurally of steel with an upper surface of shock cushioning material to act as an abutment for the cradle in the loading position (FIG. 6) and in the unloading position (FIG. 8).

In the enlarged sectional view FIG. 5, it will be noted that each cradle track 50 has two upwardly projecting portions 50a that define rails to receive depending track sections 51 of the cradle side frames 18a and 18b. A guide bar 56, which extends longitudinally along the track 50 is secured in a slot 57 in the track by capscrews 56a and is straddled by the frame members 18a and 18b to prevent shifting or sidewise creeping of the cradle off the track.

The outer edges of the side frame members 18a and and 18b and the outer edge portions of the cradle tracks 50 (FIG. 5) form the grooves 58a and 59a which receive cradle restraints 58 and 59. The cradle restraints 58 and 59, as shown in FIGS. 2 and 9, are flexible members such as chains, as illustrated, or cables which prevent torsional creep of the cradle with respect to the cradle track during the roll-over operation or resist such creep resulting from coil shock when transferring coils into and out of the cradle. The cradle restraint 59 is associated with the cradle frame segment 18b and is attached to a cradle restraint takeup 62 (FIG. 2) which in turn is attached to the stop block 52. The other end of the cradle restraint 59 is attached to a plate 60 which extends transversely across the ends of the semi-circular supporting side frame sections 18a and 18b. The cradle restraint 58 is attached first to a cradle restraint takeup 63 which in turn is attached to the stop block 53. The other end of the cradle restraint 58 is attached to a plate 61 which extends between the members 18a and 18b. The chain 58 rests in the groove 58a as shown in FIG. 5, and the chain 59 rests in the groove 59a. The restraint chains 58 and 59 (FIG. 9) associated with the cradle that rolls on track support 48 are connected respectively between a cradle restraint takeup 63 and a transverse plate 61 (FIG. 1), and between a cradle restraint takeup 62 and a transverse plate 60. FIG. 9 illustrates the restraining cables with the cradle removed. As the cradle moves toward the right, tension on the two outside chains 58 keeps the cradle from sliding or creeping to the left while it is rolling or while it is stationary but under impact loadings. And similarly, tension on the two inner chains 59 restrains the cradle from creeping to the right.

The cradle roll-over drive system 16 (FIGS. 3 and 4) includes a cradle link 68 which is attached at one end for pivotal movement about the pivot arm 66. Pivot arm 66 extends from and is attached to the semi-circular supporting side frame 18. The opposite end of the cradle link 68 is pivotally attached to the upper end of the drive lever 70 (FIG. 1). The lower end (FIG. 1) of the drive lever 70 is attached at the drive lever clevis 71 and is journaled for rotation about the clevis shaft 72.

One end of a shaft 75 is fixedly attached to the drive lever 70 while the other end is attached and journaled for rotation in the lower end (FIG. 3) of the crank link 73. The upper end (FIG. 3) of the crank link 73 is attached to and journaled for rotation about the pin 76. The opposite end of pin 76 is fixedly attached to the upper end (FIG. 3) of the crank arm 74 and crank arm 74 is fixedly attached at its lower end (FIG. 3) to the shaft 77.

Power is delivered to the shaft 77 from an electric motor 86 which can be stopped by actuation of a brake 88 mounted adjacent the motor. The power is transmitted from the electric motor 86 through the coupling 84 and the drive speed reducer 82. The output shaft 83 of the drive speed reducer 82 is connected to the drive pinion 79. The drive pinion 79 is engaged with the drive gear 78 which is mounted on and keyed to the shaft 77.

In operation, a metal or paper coil C is placed (by crane or conveyor) on the rollers 26 (shown in the horizontal position in FIG. 1) with its axis A vertical and with the cylindrical surface against the V-top bed defined by rollers 28.

The bed defined by rollers 26, when in the horizontal position, (FIG. 6) is spaced below the center CR of the circular arc defined by surface 20e of the arcuate segments of the cradle a distance D equal to the distance from the bottom of the coil to the center of gravity G of the coil (a distance equal generally to about one-half the height H of the coil). Similarly, the bed defined by rollers 28, when in the horizontal position, is spaced below the center CR of the arc of the arcuate segments of the cradle a distance S equal to or greater than the distance from the side of the coil to the center of gravity of the coil. With this construction the center of gravity G of the coil C when upright will initially lie at the center CR of the circular arc of the arcuate segments. Thus as the cradle is rolled, the center of gravity of the coil will not have to be raised, but will be moved laterally as the cradle rolls.

When the cradle is in the final position (FIG. 8), the center of gravity of the coil is at (as shown) or below the center of the circular arc of the arcuate segments. If the coil should have a diameter closely approximating the height of the coil as shown, the center of gravity of the coil will remain at or near the moving center CR as the cradle rolls. FIGS. 6, 7 and 8 illustrate the case of a coil having equal height and diameter. As the cradle rolls the center of gravity G of the coil C coincides with the line L along which the center CR of the circular arc of the arcuate segments moves throughout the entire downending operation.

Either manually or automatically, the motor brake 88 is released and the electric motor 86 is energized, transmitting power through the drive train and rotating crank arm 74 approximately 180°. The crank arm 74 transmitting torque through crank link 73 turns the drive lever 70 in an arc as shown in FIGS. 6, 7 and 8, thus rotating the cradle 12 and its contents approximately 90°. The crank link 73 moves relative to the crank arm 74 during rotation of the cradle from the overlapping parallel orientation of FIG. 6 to the extended linear orientation of FIG. 8. The swinging movement of drive lever 70 effects rotation and translation of the cradle 12 through cradle link 68. The motor speed may be controlled during the roll-over cycle for proper acceleration and deceleration.

At the end of the 90° roll-over, limit switches de-energize motor 86 and apply the motor brake 88, holding the roll-over cradle 12 in position for removal of the coil. The coil can then be removed either by an overhead crane, or by live rolls, conveyors or other means. As soon as the coil is clear, motor brake 88 is automatically released and electric motor 86 is energized rotating the crank arm 74 approximately 180° in the same direction (clockwise) as before and the empty cradle is returned through a 90° arc to its initial position (FIG. 6) where limit switches again de-energize the motor and apply the motor brake 88, holding the cradle in starting position. The motor 86 is driven, and the crank arm 74 rotated, in one direction only driving transfer and return of the cradle.

A further embodiment (FIGS. 10 and 11) contemplates a coil roll-over device utilizing the same general cradle and track arrangement as described previously and generally similar foundational and structural components. Such an embodiment would include cradle 102 which has beds (omitted from the drawing for clarity and simplification) similar to the beds 26 and 28 of roll-over device 10. The cradle 102 rolls on the tracks 107 and 108 which are supported by track supports 109 which in turn are supported by the foundation 110 in a manner similar to device 10 (see FIG. 5). The drive system for this embodiment includes a front and rear drum 112 (rear drum not shown) connected by the common shaft 114 which is supported for rotation by a front and rear mounting bracket 115 (rear mounting bracket not shown). The cable 129 is connected at one end to one end of the cradle 102 by the pin 130. From the pin 130 the cable 129 passes over the sheave 117, winds around the drum 112, and passes over the sheave 118 for attachment to its other end to the opposite end of the cradle by means of a pin 131. The rear cable 134 is attached in like fashion to the rear side of the cradle.

In operation a coil is placed on the horizontal bed or support surface of the cradle in its initial position (FIG. 10) by overhead crane, conveyor or other means. The shaft 114 and drums 112 are then driven by reversible electro-mechanical or hydraulic means (not shown) in a counterclockwise direction. After the cradle is rotated through 90° and reaches the end of its travel to the right (as viewed in FIG. 10), the motor is de-energized by limit switches. The axially reoriented coil is then removed from the cradle 102 and the motor is then energized to operate in a direction reversed from its original direction of operation. As the drums 112 rotate in a clockwise direction and the unloaded cradle 102 rolls to the left, rotating 90° to the starting position, limit switches again de-energize the motor, stopping the cradle. A brake (not shown) is applied to hold the cradle.

A still further embodiment (FIG. 12) of the coil roll-over device comprises a cradle 140 of semi-circular roll segment side frames 141a and 141b mounted rigidly in vertical parallel spaced relationship on the shaft 142. The cradle 140, which has two mutually perpendicular beds and is of semi-circular conformation as the cradles described above, is in rolling engagement with the two parallel tracks 145 (only one of which is shown). The tracks 145 are borne by a support structure similar in design to those described above. The bed, or support surface, 146 of the cradle 140 has slots 139 (FIG. 12) to receive spaced conveyor chains 148 when the bed is in a horizontal position. The bed 147 has a central gap 138 to receive the conveyor chain 149 when the bed 147 is in the horizontal position. The chain 148 is utilized to load a coil onto bed 146 for roll-over and lateral shifting; the chain 149 is utilized to unload a coil from bed 147 after roll-over and lateral shifting.

FIGS. 13, 14, 15 and 16 illustrate another embodiment of the coil roll-over device. The machine combines a mechanism for effecting two operations, conventionally done by separate machines, into a single machine and a single operation. A car 152 has a chassis 151 with wheels 153 which ride on tracks 155. A cradle 150 of the general type described in previous embodiments, is mounted on the car 152 which, is operable, on movement to the right (as viewed in FIG. 13) to remove the coil from a mandrel. The cradle 150 has semi-circular side frames 154 rigidly mounted on shaft 158 and held thereon in vertical parallel relationship. Track sections similar to those utilized on roll-over device 10, are formed on the circumference or roll surface of the semi-circular side frames which rotate through 90° on the tracks 159. Beds, or support surfaces 160 and 161, which are perpendicular to each other, are formed on the inner area of the semi-circular plates. At the initial position of the cradle on the tracks 159, (FIG. 13) the bed 160, which is V-shaped, is horizontally oriented and the bed 161, which is flat, is in a vertical orientation. At the final position of the cradle on the tracks 159 (FIG. 16), the flat bed 161 is horizontal and the originally horizontal V-shaped bed 160 is vertically oriented. Hydraulic or mechanical jacks 162, secured to the side frames 154, are provided to raise the V-shaped bed 160 in the initial position (FIG. 13) to engage the outside surface of the coil which has been wound on the mandrel 163. The stripper car 152 includes a piston rack type rotary actuator with two hydraulic cylinders 164. The hydraulic cyclinders 164 each has a piston (not shown) with teeth which engage a gear wheel (not shown) extending through a slot in the cylinder. The gear wheel 165 is mounted on a shaft 166 between the two cylinders for simultaneous engagement with the pistons of both. Rotation of shaft 166 turns drive pinions 165 which engage drive racks 167 on the lower edges of the sides of the stripper car 152.

A chain 170 is connected at one end to a pin 171 mounted on the cradle 150. The chain passes over a sheave 173 which is mounted for rotation at the left end of the car as shown in FIG. 13. From that sheave 173 the chain 170 extends to the other end of the car and over the sheave 174, which is mounted for rotation at the right end of the car. The other end of the chain is connected to a pin 172 on the cradle 150. A similar chain is connected in like fashion to the other side of the cradle. Each of the chains is anchored to the slider block, or shaft, 178 which extends transverse to the path of the stripper car 152.

The slider block, or shaft, 178 is mounted (FIG. 17) for slidable movement in slots 180 of the two stationary parallel vertical plates or frames 182. Attached to the slider block are guide rollers 185 which maintain the alignment of the slider block transverse to the path of the car 152 and allow translatory motion of the slider block along the slot.

The operation of the stripper car 152 coil roll-over device arrangement is illustrated in FIGS. 13 through 16. As shown in FIG. 13 the machine is in its initial position ready for stripping the coil from the mandrel 163. The V-shaped bed 160 on the cradle has been raised into engagement with the surface of the coil by means of hydraulic jacks 162. The coil stripper car 152 carrying the roll-over cradle 150 then begins to move along its rails 155 toward the receiving conveyor (not shown), which is located on the right in FIGS. 13 to 16, as the piston type rotary actuator 164 turns its drive pinions 165 against the drive racks 167 on the underside of the stripper car 152. During translation of the stripper car the cradle does not rotate from the position shown in FIGS. 13 and 14 until the left end of the coil, being stripped from the mandrel 163, clears the right end of the mandrel. At this time the slider block 178 (FIG. 17) attached to the roll-over drive chains 170 reaches the end of the roll-over driving slots 180 in the stationary vertical parallel plates 182.

As motion of the car 152 continues to the right toward the conveyor, the slider block 178, now held firmly in a fixed position at the end of the driving slots, creates tension on portions of the chains 170 to pull at pin 172 and roll the cradle 150, and coil, over. The movement of the car 152 to the right stops when the cradle has rotated 90° to its extreme position against the stop 181. With the cradle in this final position, (as shown in FIG. 16) the coil is placed in position for removal on the coil receiving conveyor.

The flat-top platen 161 of the cradle 150 may be slotted as the roll-over device of FIG. 12 so that when the platen 161 is in a horizontal orientation at the right end of the track (FIG. 16), strands of the coil receiving conveyor may extend into the slots in the platen 161 and provide means for removing the coil from the cradle.

As soon as the coil is removed from the cradle 150, the reverse cycle is begun with the cradle empty. As shown best in FIG. 17, the latch 184, which is mounted on a cross-shaft 183 journaled in plates 182, is biased upwardly by spring 201. The latch 184 is cammed down by the left to right movement of the slider block but resumes the position shown in FIG. 17 when the slider block reaches the extreme right end of slots 180. The latch holds the slider block 178 in the position shown in FIG. 17 after the car begins to move to the left until a limit switch (not shown) is operated by the car to energize solenoid 203 and depress the latch. The limit switch is positioned for operation after the car has moved to the position shown in FIG. 14 with the cradle in the initial coil receiving position. Thereafter, the latch is released to allow the slider block to move left as the car moves left to the position of the car and block shown in FIG. 13.

Another embodiment of the coil roll-over device utilizes the same general cradle conformation and track arrangement as shown in roll-over device 10 but with a different drive system. The drive system utilized in this embodiment is a hydraulic cylinder and lever drive as illustrated in the sequence of FIGS. 18, 19 and 20. In FIG. 18 the drive system of this embodiment as shown includes a pivot shaft 188 connected to the cradle 186. The outer end of the pivot shaft 188 is journaled for rotation in the upper end of the cradle link 190. The cradle link 190 is connected for rotation at its lower end (FIG. 18) to drive lever 192. The drive lever is pivotally connected and journaled for rotation on the pivot shaft 193 which is connected to the track support 194. The lower end of the drive lever 192 is pivotally connected to the piston 196 of the double acting hydraulic cylinder 197. The opposite end of the hydraulic cylinder 197 is connected for pivotal movement in the trunion 198 that is attached to a foundation. This drive system consisting of interconnected lever arms and a pivotally mounted hydraulic cylinder can be mounted on either side of the cradle or in the open center of the cradle between the tracks.

In operation, the coil is placed on the horizontal bed or support surface 187 of the cradle 186 when in the position shown in FIG. 18 at the initial loading position. Pressure is applied to the double acting hydraulic cylinder 197 and the piston of the cylinder 196 is extended to the left, rotating the drive lever 192 clockwise about its pivot point 193, and, as a consequence, rolling the cradle clockwise and to the right along its tracks as shown in the sequence of FIGS. 18, 19 and 20. As the cradle nears the end of 90° of rotation, limit switches (not shown) are tripped and further extension of the piston 196 of the hydraulic cylinder 197 is discontinued. A brake (not shown) is applied and the cradle is then unloaded as the coil, which has had its axis revolved through 90°, is removed by conveyor, crane, or by other means. The brake is released and pressure is then applied to the double acting hydraulic cylinder 197 in a direction opposite that of the original pressure application and the piston of the cylinder is withdrawn to the right to rotate the drive lever 192 in a counterclockwise direction and to rotate and shift the cradle in turn 90° from its position as shown in FIG. 20 to the initial position of FIG. 18. Limit switches are again activated and further withdrawal of the piston into the hydraulic cylinder is stopped. A brake is then applied holding the cradle in the position with platen 187 oriented horizontally.

Although the best mode contemplated for carrying out the present invention has been herein shown and described, it will be apparent that modification and variation may be made without departing from what is regarded to be the subject matter of the invention.

I claim:

1. A device for upending or downending an object comprising, in combination, a cradle having arcuate segments for rolling and having beds angularly oriented relative to each other, said beds located below the center of curvature of the arcuate segments to hold the object with the center of gravity thereof close to the center of curvature of the arcuate segments of the cradle, supporting means including a way over which the arcuate segments roll, and means including a drive train for rolling said arcuate segments from one position to another for shifting said objects from one bed to another to axially reorient and laterally transfer the object, a drive shaft at the output end of the drive train, a crank arm mounted on the drive shaft, a drive lever pivoted to the supporting means, a crank link connected between the crank arm and the drive lever to swing the drive lever through an arc, and a cradle link connected between the drive lever and the cradle to transmit the motion of the drive lever to the cradle.

2. The apparatus of claim 1 in which the pivotal connection of the drive lever to the supporting means constitutes a fulcrum for the drive lever and in which the crank link is connected to the drive lever between the fulcrum and the cradle link.

3. A device for upending or downending an object comprising, in combination, a cradle having arcuate treads for rolling and having beds angularly oriented relative to each other, said beds located below the center of curvature of the arcuate segments to hold the objects with the center of gravity thereof close to the center of curvature of the arcuate segments of the cradle, supporting means including a straight track over which the arcuate segments roll, and means including a drive train for rolling said arcuate segments from one position to another for shifting said objects from one bed to another to axially reorient and laterally transfer the object, a drive shaft rotatable in a predetermined direction at the output end of the drive train, a crank connected to the drive shaft, and motion transmitting linkage connecting the crank to the cradle to swing the cradle through a cycle on said way including rotation of the cradle ninety degrees in one direction and ninety degrees in the opposite direction in response to rotation of said drive shaft in said predetermined direction.

* * * * *